United States Patent [19]

Bailey et al.

[11] Patent Number: 5,024,145
[45] Date of Patent: Jun. 18, 1991

[54] VIBRATORY BULK MATERIAL PROCESSOR AND METHOD

[75] Inventor: Richard G. Bailey, Overland Park, Kans.; Merton R. Leggott, Lincoln, Nebr.

[73] Assignee: Flakee Mills, Inc., Lincoln, Nebr.

[21] Appl. No.: 399,258

[22] Filed: Aug. 28, 1989

[51] Int. Cl.⁵ .......................... A23L 3/26; F26B 23/08
[52] U.S. Cl. ............................. 99/451; 34/1;
   99/477; 99/DIG. 14; 219/10.55 R; 219/10.55 A
[58] Field of Search ...................... 99/358, 443 C, 451,
   99/477, 483, DIG. 14; 219/10.55 A, 10.55 R;
   34/1; 426/241, 242, 243; 366/111, 114

[56] References Cited

U.S. PATENT DOCUMENTS

| | | | |
|---|---|---|---|
| 2,428,090 | 9/1947 | Naeher et al. | 99/451 |
| 3,694,220 | 9/1972 | Pierce . | |
| 3,701,670 | 10/1972 | Pierce . | |
| 3,703,861 | 11/1972 | Slack et al. | 99/443 C |
| 3,961,569 | 6/1976 | Kenyon et al. | 99/483 |
| 4,065,361 | 12/1977 | Hanson | 219/10.55 A |
| 4,072,762 | 2/1978 | Rhodes | 99/451 |
| 4,153,733 | 5/1979 | Pierce . | |
| 4,322,444 | 3/1982 | Zuilichem et al. . | |
| 4,567,340 | 1/1986 | Latchum, Jr. | 34/1 |
| 4,570,045 | 2/1986 | Jeppson | 219/10.55 A |
| 4,687,895 | 8/1987 | Chitre et al. | 99/DIG. 14 |
| 4,776,267 | 10/1988 | Harris | 99/477 |
| 4,808,782 | 2/1989 | Nakagawa et al. | 426/241 |

FOREIGN PATENT DOCUMENTS

| | | |
|---|---|---|
| 993259 | 7/1976 | Canada . |
| 3721762 | 7/1988 | Fed. Rep. of Germany ........ 99/451 |
| 1379116 | 1/1975 | United Kingdom . |

Primary Examiner—Timothy F. Simone
Attorney, Agent, or Firm—Litman, McMahon & Brown

[57] ABSTRACT

A bulk material processor includes a tray assembly with a panel subassembly having an upper panel section and a lower panel section. The upper panel section is adapted to receive bulk material and pass it to the lower panel section for discharge. A heater panel is mounted over the tray assembly for radiantly heating the bulk material passing thereunder. A vibrator is coupled to the tray assembly for vibrating the bulk material whereby it advances along the tray assembly. A control system is provided for controlling the operation of the vibrator and for controlling the output of the heater panel. A method of bulk material processing includes cascading the bulk material from an upper panel section to a lower panel section by vibration and subjecting it to infrared radiation.

24 Claims, 2 Drawing Sheets

VIBRATORY BULK MATERIAL PROCESSOR AND METHOD

BACKGROUND OF THE INVENTION

1. Field of the Invention

The present invention relates generally to bulk material processing and in particular to radiation processing of food and feed materials.

2. Description of the Prior Art

Various materials for human food and animal feed are processed in preparation for consumption. Such material processing can include cleaning, cooking, grinding, mixing, etc. For example, many materials such as grains, vegetable beans, seeds and nuts are cooked to improve their taste, texture, digestability and spoilage resistance. Materials can be steamed, boiled, popped, cracked, etc. in preparation for consumption. In addition to these cooking methods, infrared radiation has also been employed for cooking and for controlling molds, fungi, yeast, spores and bacteria to retard spoilage. The Pierce U.S. Pat. Nos. 3,694,220; 3,701,670 and 4,153,733 disclose an infrared radiation cooking method, an infrared micronizing cooker and an infrared radiation cooked wafer respectively.

Both the aforementioned Pierce '220 and '670 patents disclose infrared cooking equipment with tilted plates connected to vibrators for advancing the material in a downhill direction beneath infrared radiators or heaters.

The Newton British Patent No. 1,379,116 discloses another type of infrared radiation cooking equipment wherein cereals and other seeds are conveyed beneath infrared heaters on an endless woven wire belt. The belt-type infrared radiation processor disclosed in the Newton '116 British patent can be utilized in a method for dehulling cacao beans disclosed in the Zuilichem et al. U.S. Pat. No. 4,322,444.

Infrared radiation processing can benefit a number of food and feed materials. For example, the starches of cereal grains can be gelatinized thereby for improved digestability. Some grains and seeds can be swollen and fractured by infrared radiation for improved texture. Moreover, infrared cooking of some cereal grains and vegetable beans can enhance their flavors, appearances, digestability and nutritional values.

Infrared cooking can also be important for controlling spoilage in processed food and feed materials. For example, untreated oat groats include an enzyme which can cause rancidity or oxidization if not neutralized. Infrared cooking can neutralize these enzymes and thus extend the shelf life of infrared-cooked oat groats in sealed containers to several months. Similar results can be achieved by infrared radiating rice kernels, which are otherwise susceptible to rapid spoilage caused by lipase enzymes. Furthermore, various flours used to bake bread can be infrared cooked to control rope spores which can spoil the finished product.

Heretofore there has not been a bulk material processor or processing method with the advantages and features of the present invention.

SUMMARY OF THE INVENTION

In the practice of the present invention, a bulk material processor is provided which includes a framework assembly mounting a vibratory feeder assembly at an upstream end of the processor and a plurality of tray assemblies in a longitudinally-aligned series extending from the upstream end to a processor downstream end. Each tray assembly includes a panel subassembly comprising a plurality of individual panel sections in a stairstep configuration. The tray assemblies are mounted on the framework assembly in a descending line whereby each tray assembly is positioned slightly higher than the next tray assembly downstream.

A vibration system is provided and includes a vibrator assembly for the feeder assembly and a vibrator assembly for each tray assembly. The bulk material is advanced along the panel subassemblies by vibration. A heating system includes a plurality of heater panels positioned over the tray assemblies for heating the bulk material flowing thereunder, primarily by radiation. The heater assemblies can comprise, for example, electrically powered or fossil-fuel powered infrared heaters.

A method of processing bulk material is disclosed which includes the steps of receiving, cleaning, moisturizing, tempering, preheating, processing, roller-milling, retaining, cooling, storing and consuming a product suitable for animal or human consumption from a bulk material.

OBJECTS AND ADVANTAGES OF THE PRESENT INVENTION

The principal objects and advantages of the present invention include: providing a bulk material processor; providing such a processor which is particularly adapted for processing food and feed materials for human and animal consumption; providing such a processor which is particularly adapted for processing cereal grains, vegetable beans, seeds and nuts; providing such a processor which utilizes infrared radiation; providing such a processor which turns, rotates and tumbles the material; providing such a processor which provides relatively uniform processing; providing such a processor which can utilize various energy sources; providing a method for processing bulk material; providing such a method which is relatively efficient; providing such a method which can be utilized on a variety of human food and animal feed materials; providing such a method which is relatively variable and adaptable; and providing such a method which is particularly adapted for its proposed usage.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
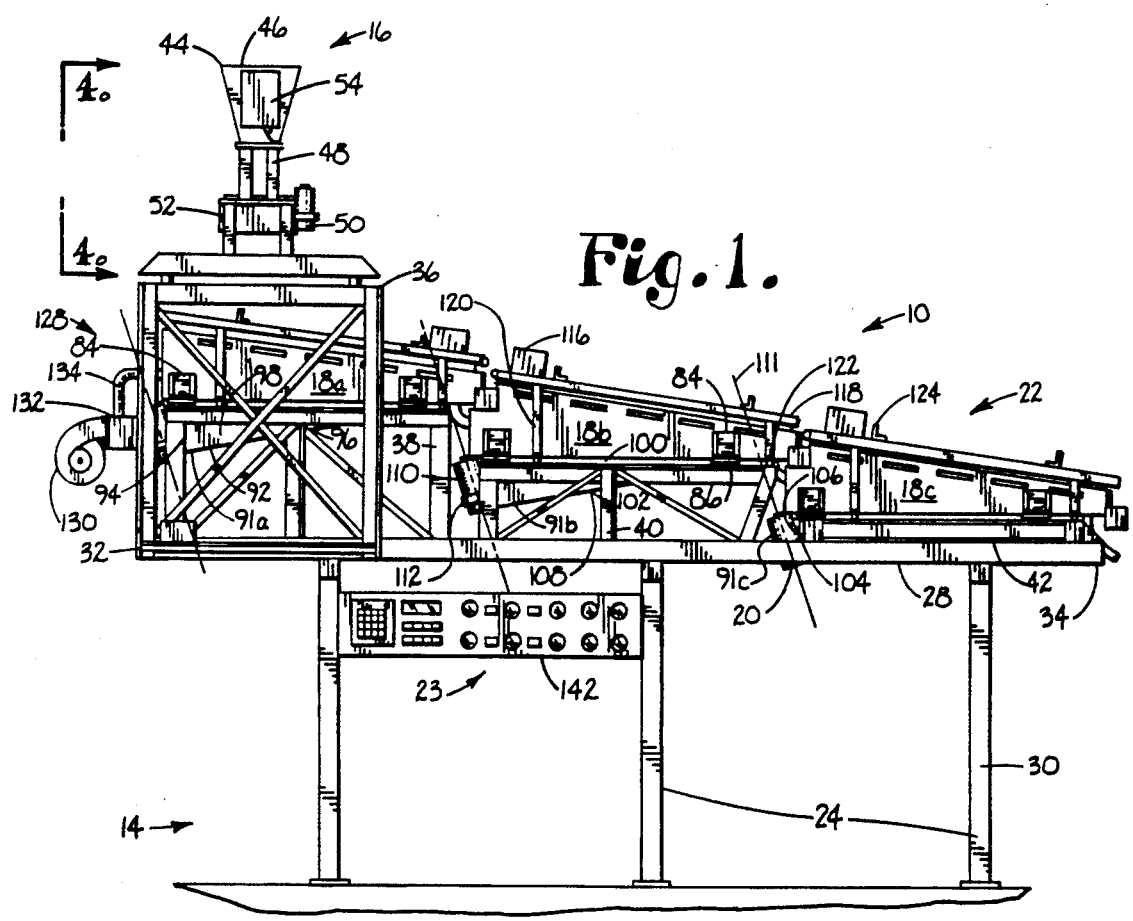
FIG. 1 is a side elevational view of a bulk material processor embodying the present invention.
Figure 2:
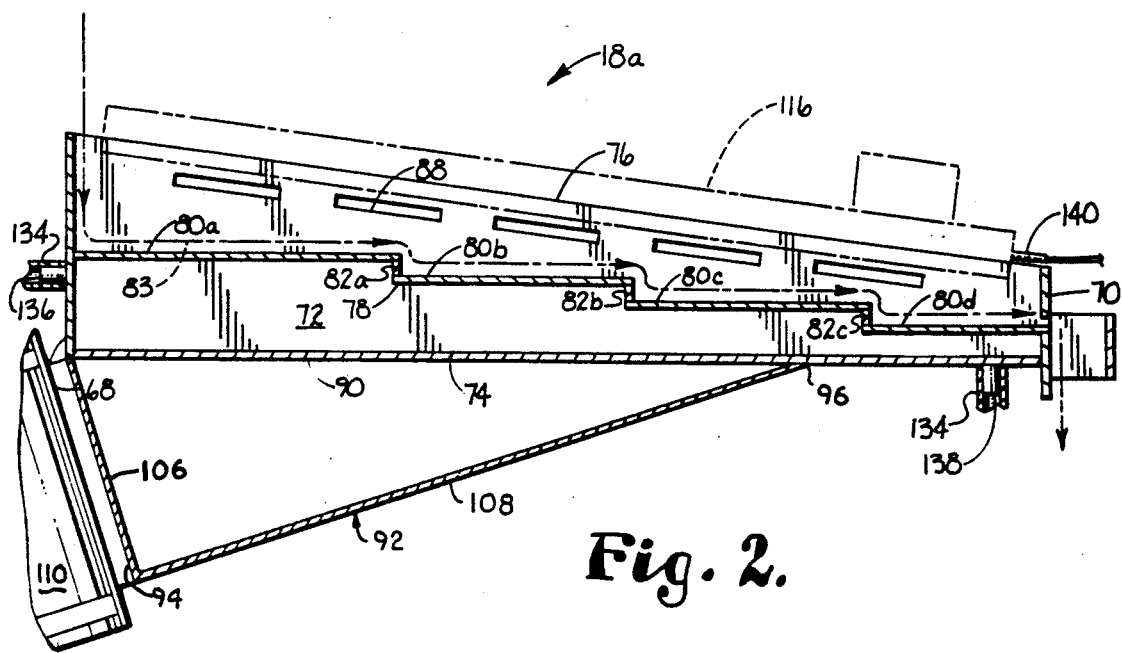
FIG. 2 is an enlarged, fragmentary, cross-sectional view of the processor, particularly showing a tray assembly thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience and reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the structure being referred to. "Upstream" and "downstream" relate to the product flow path. Said terminology will include the words specifically mentioned, derivatives thereof and words of similar import.

Referring to the drawings in more detail, the reference numeral 10 generally designates a bulk material processor according to the present invention. The processor 10 is adapted for processing bulk material 12 which may comprise, for example, various food materials for human consumption and feed materials for animal consumption. Without limitation on the generality of useful applications of the processor 10 and the processing method, particularly suitable materials for processing including cereal grains, vegetable beans, seeds and nuts.

The processor 10 generally comprises a structural framework assembly 14, a feeder assembly 16, a plurality (e.g. three are shown) of tray assemblies 18a-18c, a vibration system 20, a heating system 22, and a control system 23.

II. Framework Assembly 14

The framework assembly 14 includes six upright columns 24, three on each side of the processor 10, innerconnected by transverse crossbeams 26 and by a pair of longitudinally-extending longitudinal members 28 each extending along a respective side of the processor 10. The columns 24, crossbeams 26 and longitudinal members 28 form a base subframe 30 with upstream and downstream ends 32, 34.

A feeder assembly subframe 36 is mounted on top of the base subframe 30 in proximity to its upstream end 32. An upstream tray assembly subframe 34 is mounted on top of the base subframe 30 and can be positioned somewhat within the feeder assembly subframe 36. An intermediate tray assembly subframe 40 is mounted on top of the base subframe 30 approximately midway therealong and a downstream tray assembly subframe 42 is mounted on the base subframe 30 in proximity to its downstream end 34.

The framework assembly 14 may comprise suitable structural steel members—e.g. steel tubes, angle sections, channels, gussets, etc.—innerconnected by suitable mechanical fastening means, such as weldments, bolts, rivets, clamps, etc.

III. Feeder Assembly 16

The feeder assembly 16 is mounted on the feeder assembly subframe 36 and includes a hopper 44 with an upwardly-open mouth 46. A throat 47 is provided at a lower end of the feeder assembly 16 for discharging bulk material. A vibrator 50 is mounted on a downstream side of the feeder assembly 16 and facilitates the flow of bulk material 12 from the feeder assembly 16. The vibrator 50 can comprise a Model SCR-200 eccentric or off-center weighted rotary vibrator, which is available from Vibco, Inc. of Wyoming, R.I. The vibrator 50 can be variable speed and variable force.

A feeder assembly discharge gate 52 is provided on the feeder assembly upstream end and is vertically adjustable for adjusting the flow from the feeder assembly 16. A product level switch 54 can be mounted on a side of the feeder assembly 16 and can be set to close when the material level in the hopper 44 falls below a certain, predetermined low level whereby a supply mechanism (not shown, but possibly comprising a grain drill or the like) can be activated to refill the hopper 44.

IV. Tray Assemblies 18a-18c

The upstream, intermediate and downstream tray assemblies 18a, 18b and 18c are respectively mounted on the upstream, intermediate and downstream tray assembly subframes 38, 40 and 42. Each tray assembly 18a-18c includes upstream and downstream ends 68, 70 and a pair of transversely-spaced, generally vertical side walls 72 with lower, generally horizontal edges 74 and upper edges 76.

Each tray assembly 18a-18c includes a panel subassembly 78 comprising a plurality (e.g. four) of substantially horizontal, generally planar panel sections 80a-80d aligned longitudinally with respect to each other from the tray assembly upstream end 68 to its downstream end 70. The panel sections 80a-80d include respective upper surfaces 81. Generally vertical transition walls 82a-82c interconnect respective adjacent pairs of panel sections 80a-80d. Specifically, transition wall 82a interconnects panel sections 80a and 80b, transition wall 82b interconnects panel sections 80b and 80c, and transition wall 82c interconnects panel sections 80c and 80d. The panel subassembly 78 has a generally stair-step configuration with each panel section 80b-80d being slightly lower than the next panel section upstream. The panel subassembly 78 forms a cascading flow path 83 for the bulk material 12 which extends longitudinally in successively lower steps from the tray assembly upstream end 68 to its downstream end 70.

Each tray assembly 18a-18c includes four feet 84 projecting transversely outwardly from the side wall 72 in proximity to the tray assembly ends 68, 70. Height-adjustable, pneumatic support dampeners 86 interconnect the feet 84 and the tray assembly subframes 38, 40 and 42. The dampeners 86 may comprise air mount Model No. 16 units available from the Firestone Tire and Rubber Company.

Each side wall 72 includes a plurality of longitudinally-spaced vent slots 88 which extend in generally parallel relation spaced below the respective side wall upper edges 76. By way of example only, five vent slots 88 are shown in each side wall 72. A bottom panel 90 extends between the side wall lower edges 74 in a generally horizontal plane.

V. Vibration System

The vibration system 20 includes a plurality (e.g. three) of vibrator assemblies 91a–91c each including a respective vibration coupling subassembly 92 mounted on a respective tray assembly bottom panel 90 and including upstream and downstream ends 94, 96.

Each vibration coupling subassembly 92 includes a pair of generally vertical, transversely-spaced, triangularly-shaped side walls 98 with upper and lower margins 100, 102 converging at the subassembly downstream end 96 and an upstream margin 104 which intersects the upper margin 98 at an angle of approximately seventy-two degrees. Each vibration coupling subassembly 92 includes an upstream end panel 106 extending transversely between the upstream sides 104 and a lower panel 108 extending transversely between the side wall lower sides 102. The aforementioned angle of approximately seventy-two degrees formed by the side wall upper and upstream margins 98 and 104 determines the slope in a downstream direction from top-to-bottom of the upstream end panel 106, which slopes approximately eighteen degrees from the vertical.

Each vibrator assembly 91a–91c includes a pair of vibrator units 110 mounted in transversely juxtaposed relation on the coupling subassembly end panel 106. The vibrator units 110 can comprise, for example, heavy-duty electric vibrators such as those available from Vibco, Inc. of Wyoming, R.I., e.g. Model No. 4P1000 8/17/89. Suitable vibrator units could employ either eccentric rotary or reciprocating principles of operation. The aforementioned Vibco vibrator units 110 employ an eccentric or off-center imbalanced rotary principle of operation, and can be adjusted with respect to speed and vibratory force amplitude. The vibratory units 110 are attached to the end panels 106 in vibration-coupling relationships with the vibration coupling subassemblies 92 by mounting bolts 112. The vibrator units 110 have rotational axes 111 which extend generally parallel to the end panels 106 on which the vibrator units 110 are mounted. Thus, the rotational axes 111 are tilted at angles of approximately eighteen degrees from the vertical. The vibratory force waves emitting from the vibrator units 110 eminate radially outwardly from the rotational axes 111, and are thus transmitted through the vibration coupling subassemblies 92 in an upward and downstream direction to the tray assemblies 18a–18c. Such vibratory forces thus tend to cause the bulk material 12 on the panel subassemblies 78 to flow in a downstream direction. The vibratory force waves also tend to lift the bulk material 12 from the upper surfaces of the panel section 80a–80d because of the upward component of the vibratory force vectors. Downstream motion is achieved by the downstream component of the vibratory force vectors. The vibrator units 110 can operate on alternating current electrical power with a nominal voltage of approximately two hundred and thirty volts.

VI. Heating System 22

The heating system 22 includes a plurality of infrared heater panels 116 each mounted on a respective heater panel subframe 118 with legs 120 resting on vibration-dampening feet 122 which engage the tray assembly subframes 38, 40 and 42 respectively. Transverse, angle section crossbars 124 extend in longitudinally-spaced pairs across the heater panel subframes 118, each pair suspending a respective heater panel 116 over a respective tray assembly 18a–18c.

The heater panels can be electrically powered or can be powered by a fossil fuel, such as natural gas. Although radiation in the infrared range is suitable for accomplishing the objects of the present invention, radiation in other ranges (e.g. microwave, ultraviolet, etc.) could also be employed. Electrically powered heater panels can be connected to a suitable source of electrical power and fossil-fuel powered heater panels can be connected to a suitable source of fossil fuel.

VII. Control System 23

The control system 23 includes a forced-air cooling system 128 including a pair of fans or blowers 130 connected to a manifold 132 which in turn is connected to an air duct 134. The air duct 134 is pneumatically coupled to an inlet coupling on the upstream end 68 of the upstream tray assembly 18a. Air flows from the fans 130, through the manifold 132, through the air duct 134, and into the tray assembly 18a interior at the inlet coupling 136. An outlet coupling 138 is located in proximity to the tray assembly downstream end 70 in the bottom panel 90. Each tray assembly 18a–18c includes inlet and outlet couplings 136, 138 which are serially connected between the tray assemblies 18a–18c whereby airflow enters the upstream tray assembly 18a, flows through the intermediate tray assembly 18b and exits the downstream tray assembly 18c, thereby removing excess heat from each.

A sensor 140 is placed over the product flow path to provide a signal corresponding to the product heat, which signal can be monitored by the control system 23 or by an operator. Interactive temperature control systems are available for adjusting the power input to the heater panels 116 in response to signals from the sensor 140.

An electrical control panel 142 can be mounted on the framework assembly 14 for controlling the operation of the processor 10. The control panel 142 can include controls for individually and/or collectively controlling the power input (and hence the heat output and radiation wave range) of the heater panels 116. The frequency and amplitude of the vibrations emitted by the vibrators 50, 110 can also be controlled at the control panel 142. The paired, juxtaposed vibrator units 110 can be independently controlled with respect to their adjustable vibratory frequencies and amplitudes. The flow characteristics of the bulk material 12 can thus be varied. For example, the flow speed can be adjusted by adjusting the vibratory frequencies and amplitudes of the vibrators 110. Suitable temperature gauges, amp meters, safety and startup switchgear and the like can be provided on the control panel 142.

VIII. Operation

Figure 3:
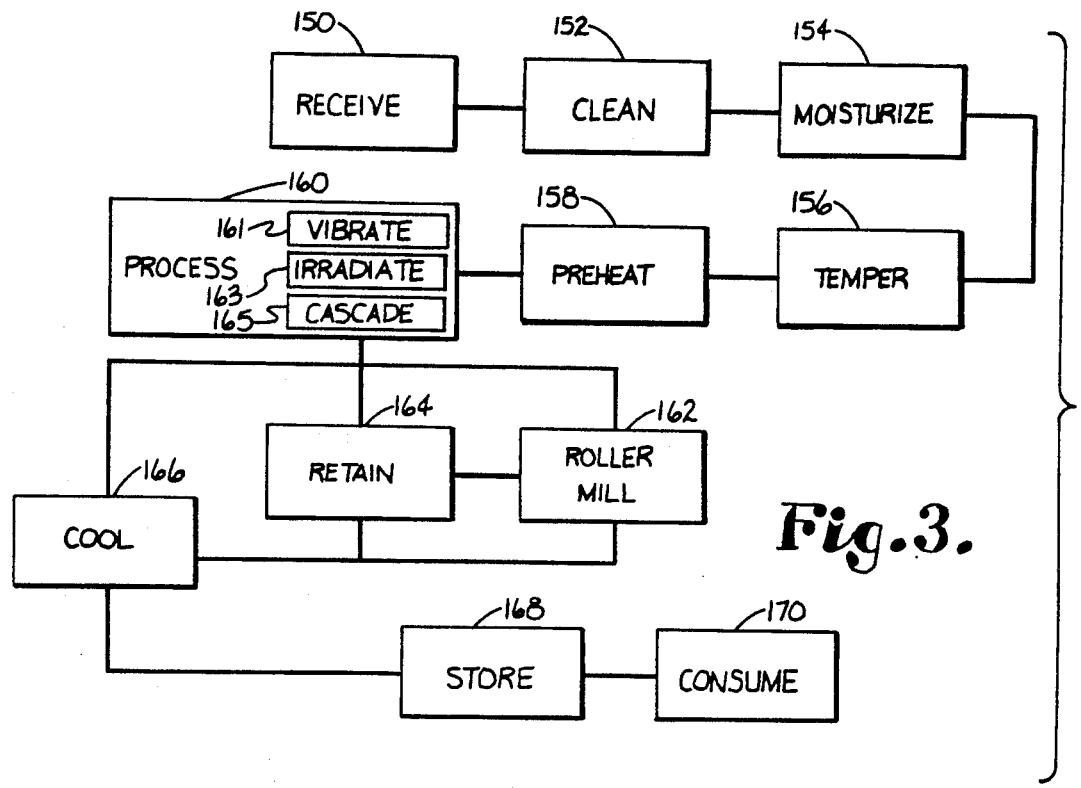
FIG. 3 is a schematic view showing the steps of a method of processing bulk material according to the present invention.
Figure 5:
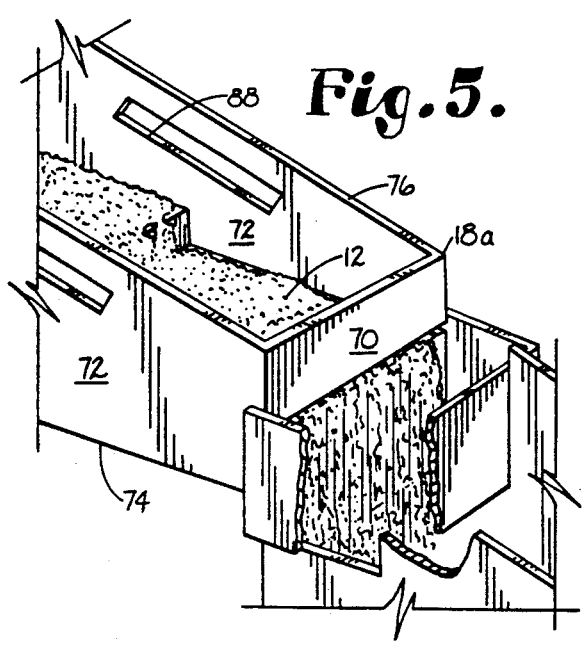
FIG. 5 is a fragmentary, enlarged, perspective view of the processor, particularly showing a tray assembly
Figure 4:
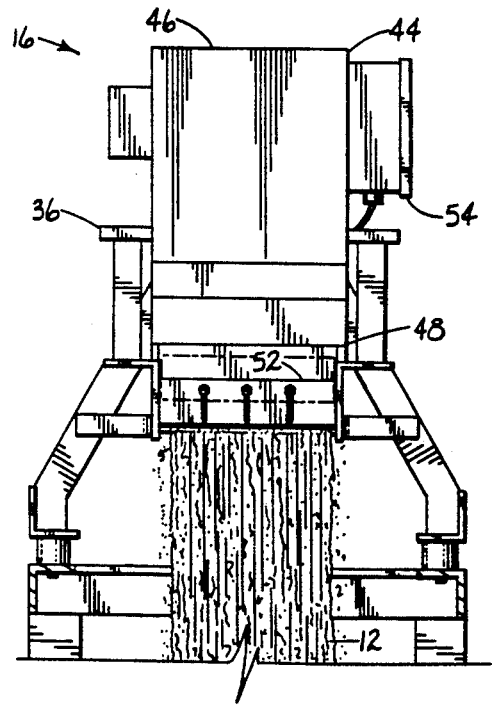
FIG. 4 is a fragmentary, enlarged, downstream elevational view of a feeder assembly of the processor.

The bulk material processing method of the present invention is schematically illustrated in FIG. 3 as the method might be utilized for processing a food or feed product from a bulk material. Without limitation on the generality of useful bulk materials which can be processed with or according to the present invention, certain cereal grains, vegetable beans, seeds and nuts are suitable for processing.

The bulk material is received 150, subjected to a cleaning step 152 (e.g. air cleaning, sifting, etc.), moisturized (e.g. with a moisturizing blower or by steam injection) 154, tempered whereby the moisture is absorbed at 156, preheated by any of various available preheating means 158, and processed 160 with the processor 10.

After processing 160, the bulk material 12 will have received heat in the form of radiant energy and have an elevated temperature. The heated bulk material 12 can then be passed to a roller mill for rolling and/or crushing it 162 to flakes or the like. Another optional step comprises retention 164 of the material 12, e.g. in an insulated retention vessel, whereby the beneficial effects of the applied heat can be enhanced. A cooling stage 166 may also be provided, whereafter the material can be stored 168 and consumed 170.

It will be appreciated that many of the aforementioned steps are optional, and the appropriate steps and their sequence of operation can be chosen pursuant to the requirements of particular bulk materials being processed and the desired characteristics of the finished products. For example, as indicated in FIG. 3, the roller mill step 162 and the retention step 164 can be bypassed altogether, or used independently or together.

Within the process step 160, the bulk material 12 is vibrated 161, irradiated 163 and cascaded 165 whereby the bulk material 12 tends to cascade through the tray assemblies 18a–18c with drops between respective tray panel sections 80a–80b at the panel transition walls 82a–82c. The panel subassemblies 78 can be designed with the drops and the corresponding transition wall 82a–82c heights equal to, for example, approximately one and one-half inches. Uniform irradiation of the bulk material 12 is thus promoted since each seed, kernel, grain, etc. would normally turn several times as it flows through the processor 10. Scorching, burning and accidental fires can thus be minimized. The vent slots 88 permit steam to escape from the bulk material 12 as it is driven out by the radiation.

It is to be understood that while certain forms of the present invention have been illustrated and described herein, it is not to be limited to the specific forms or arrangement of parts described and shown.

What is claimed and desired to be secured by Letters Patent is as follows:

1. A bulk material radiation processor, which includes:
   (a) a framework assembly;
   (b) a tray assembly, which includes:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) a material flow path from said tray assembly upstream end to said tray assembly downstream end over said plate material-receiving upper surfaces and between said tray assembly side walls; and
      (6) mounting means for mounting said tray assembly on said framework assembly;
   (c) a vibrator operably connected to said tray assembly;
   (d) an infrared heater mounted on said frame assembly over said material flow path; and
   (e) vibration dampening means comprising a pneumatic shock absorber connected to said frame assembly and said tray assembly.

2. The processor according to claim 1, which includes:
   (a) a feeder assembly mounted over said tray assembly upper plate and including a hopper adapted to receive material and a discharge gate adapted to discharge material from said hopper onto said tray assembly upper plate.

3. The processor according to claim 2 wherein:
   (a) said discharge gate is adjustable whereby the discharge rate of material from said hopper is variable.

4. The processor according to claim 2 wherein:
   (a) said heater assembly includes a vibrator mounted on said hopper.

5. The processor according to claim 1 wherein:
   (a) said vibrator comprises a rotary, eccentrically-weighted, electrically powered vibrator unit.

6. The processor according to claim 5 wherein:
   (a) said vibrator unit includes a rotational axis tilted in an upstream direction from bottom-to-top from vertical.

7. The processor according to claim 1 wherein:
   (a) said tray assembly includes a vibration coupling subassembly mounting said vibrator.

8. The processor according to claim 7 wherein:
   (a) said tray assembly includes a bottom panel mounting said vibration coupling subassembly; and
   (b) said vibration coupling subassembly includes an upstream end panel mounting said vibrator.

9. A bulk material radiation processor, which includes:
   (a) a framework assembly;
   (b) a tray assembly, which includes:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) a material flow path from said tray assembly upstream end to said tray assembly downstream end over said plate material-receiving upper surfaces and between said tray assembly side walls; and
      6) mounting means for mounting said tray assembly on said framework assembly;
   (c) a vibrator operably connected to said tray assembly;
   (d) an infrared heater mounted on said frame assembly over said material flow path; and
   (e) a shock absorber connected to said framework assembly and said tray assembly.

10. The processor according to claim 9 wherein:
    (a) said radiation means comprises an infrared heater.

11. The processor according to claim 10 wherein:
    (a) said infrared heater is electrically-powered.

12. The processor according to claim 10 wherein:
    (a) said infrared heater is gas-fired.

13. The processor according to claim 9, which includes:

(a) said shock absorber comprising a first shock absorber;
(b) a second shock absorber connected to said framework assembly and said tray assembly; and
(c) said shock absorbers comprising said mounting means.

14. A bulk material radiation processor, which includes:
   (a) a framework assembly;
   (b) a tray assembly, which includes:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) a material flow path from said tray assembly upstream end to said tray assembly downstream end over said plate material-receiving upper surfaces and between said tray assembly side walls; and
      (6) mounting means for mounting said tray assembly on said framework assembly;
   (c) a pair of vibrators operably connected to said tray assembly upstream end; and
   (d) an infrared heater mounted on said frame assembly over said material flow path.

15. The processor according to claim 14, which includes:
   (a) said tray assembly mounting means including vibration dampening means.

16. The processor according to claim 15 wherein:
   (a) said vibration dampening means comprises a pneumatic shock absorber connected to said frame assembly and said tray assembly.

17. The processor according to claim 16, which includes:
   (a) four of said pneumatic shock absorbers each mounted adjacent a respective tray assembly side wall and adjacent one of said tray assembly upstream and downstream ends.

18. The processor according to claim 17 wherein:
   (a) each said pneumatic shock absorber is pneumatically height-adjustable.

19. A bulk material radiation processor, which includes:
   (a) a framework assembly;
   (b) first and second tray assemblies each including:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) mounting means for serially mounting said first and second tray assemblies on said framework assembly with said first tray assembly downstream end over said second tray assembly upstream end;
      (6) a material flow path from said first tray assembly upstream end, over said first tray assembly plate material-receiving upper surfaces to said first tray assembly downstream end, over said first tray assembly downstream end to said second tray assembly upstream end, over said second tray assembly plate material-receiving upper surfaces to said second tray assembly downstream end, and over said second tray assembly downstream end;
   (c) first and second vibrators operably connected to said first and second tray assemblies respectively; and
   (d) an infrared heater mounted on said frame assembly over said material flow path.

20. A bulk material radiation processor, which includes:
   (a) a framework assembly;
   (b) a tray assembly, which includes:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) a material flow path from said tray assembly upstream end to said tray assembly downstream end over said plate material-receiving upper surfaces and between said tray assembly side walls; and
      (6) mounting means for mounting said tray assembly on said framework assembly;
   (c) a vibrator operably connected to said tray assembly;
   (d) an infrared heater mounted on said frame assembly over said material flow path; and
   (e) said vibrator comprising a rotary, eccentrically hyphenlated, electrically powered vibrator unit including a rotational axis tilted in an upstream direction from bottom-to-top from vertical.

21. The processor according to claim 20, wherein:
   (a) said vibrator rotational axis tilt angle is approximately eighteen degrees.

22. A bulk material radiation processor, which includes:
   (a) a framework assembly;
   (b) a tray assembly, which includes:
      (1) a pair of transversely-spaced side walls;
      (2) an upper plate extending transversely between said side walls and including a material-receiving upper surface and longitudinally-spaced upstream and downstream ends;
      (3) a lower plate extending transversely between said side walls and including a material-receiving upper surface and longitudinally-spaced upstream and downstream ends;
      (4) longitudinally-spaced upstream and downstream tray assembly ends;
      (5) a material flow path from said tray assembly upstream end to said tray assembly downstream end over said plate material-receiving upper surfaces and between said tray assembly side walls; and (6) mounting means for mounting said tray assembly on said framework assembly;

(c) a vibrator operably connected to said tray assembly;

(d) an infrared heater mounted on said frame assembly over said material flow path;

(e) said tray assembly including a bottom panel mounting said vibration coupling subassembly; and (f) said vibration coupling subassembly including an upstream end panel mounting said vibrator.

23. The processor according to claim 22, which includes:

(a) said vibrator comprising a first vibrator unit;

(b) a second vibrator unit; and (c) said first and second vibrator units being mounted on said vibration coupling subassembly upstream end panel in transversely juxtaposed relationship.

24. The processor according to claim 23, wherein:

(a) said vibrator units are independently adjustable with respect to vibration frequency and amplitude.

* * * * *